July 20, 1948.  J. I. MARCUM  2,445,445
DUAL CAVITY-RESONATOR SWITCHING SYSTEM
Filed Nov. 13, 1943
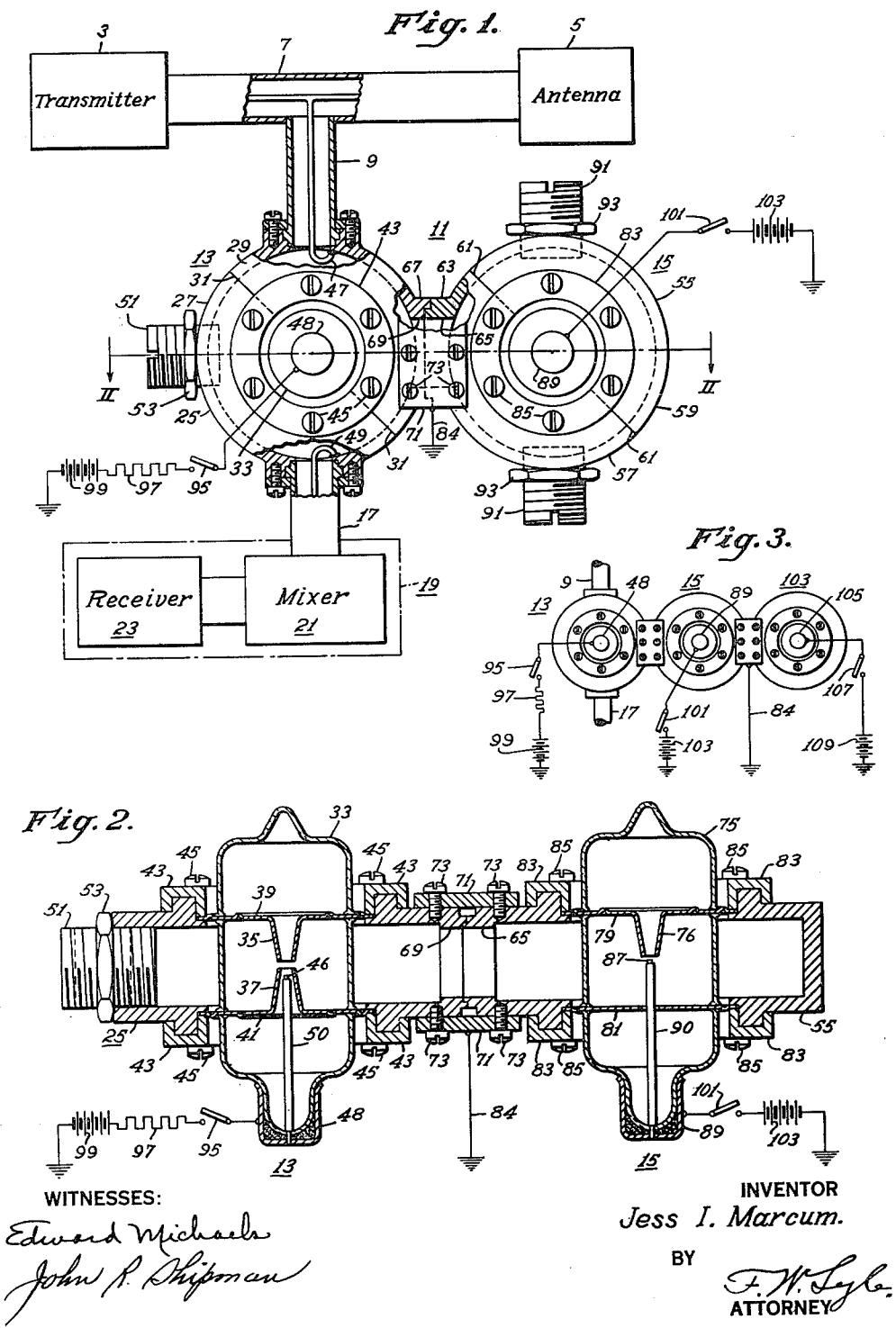
WITNESSES:
Edward Michaels
John P. Shipman
INVENTOR
Jess I. Marcum.
BY F. W. Lyle
ATTORNEY Patented July 20, 1948

2,445,445

UNITED STATES PATENT OFFICE 2,445,445

DUAL CAVITY-RESONATOR SWITCHING SYSTEM

Jess I. Marcum, Wilkinsburg, Pa., assignor to Westinghouse Electric Corporation, East Pittsburgh, Pa., a corporation of Pennsylvania Application November 13, 1943, Serial No. 510,161

10 Claims. (Cl. 178—44)

This invention relates to an ultra-high-frequency tube, and has particular relation to a transmitter-receiver tube for use in an ultra-high-frequency power system.

In the usual radar system, objects are located by transmitting an ultra-high-frequency signal in a known direction and picking up any returning signal which is reflected from an object in the path of the transmitted signal. A transmitter-receiver tube, commonly known as a TR box, is employed in radar systems in which a single antenna is used both to transmit and to receive signals. The transmitter is connected by wave guides or coaxial transmission lines directly to the antenna and the receiving system including a receiver and mixer, is connected by wave guides or coaxial transmission lines to the antenna through the TR box. The function of the TR box is to permit low-power incoming signals to pass to the receiver and to prevent the high-power signals from the transmitter from passing to the receiver in sufficient strength to damage it. The usual TR box comprises a highly conducting shell forming a cavity resonator with a low pressure electrode-gap therein. When low-power incoming signals are supplied to the TR box, it functions as a cavity resonator forming an effective highly resonant circuit having a high Q, or ratio of the energy stored to the energy lost per cycle, and effects the transmission of the signals therethrough. On the other hand, high power signals cause an electric discharge to be established across the electrode-gap which changes the resonator from an effective resonant circuit to a non-resonant one having an extremely low Q so that it reflects most of the electromagnetic waves of the signal and prevents passage thereof to the receiver.

At the present time a beacon radar system is generally employed where the radar system is mounted on a mobile unit such as a ship or an airplane. A beacon radar system, in addition to performing the usual functions of a radar system, also gives homing or position information to its operator. Several fixed ultra-high-frequency transmitters are located at known points. These are called beacon stations and are capable of transmitting a coded set of signals which will convey to the operator of the radar system receiving such coded signals, information respecting his position. Operation of a beacon transmitter in the vicinity of a movable radar system may be initiated by the receipt at the beacon station of a series of coded signals transmitted from the radar system.

To avoid any conflict in the receiver of the radar system between beacon signals and reflected radar signals, the beacon transmitter is adjusted to operate on a fixed frequency just outside the frequency band of the radar system. For example, if the frequency band of the radar system is from 9500 to 9700 megacycles, the beacon transmitter may be adjusted to operate at 9450 megacycles. Since the same antenna, TR box, and receiving system are used for the reception of both the reflected radar signal and the beacon signal, it is apparent that unless the radar system has a very broad frequency band, the beacon signal will not be received at the same sensitivity as a radar signal. As the TR box in the radar system has a very high Q with respect to the transmission of radar frequency signals, it is very frequency sensitive. Consequently, it is considerably off resonance for the beacon signal frequency. In a typical case, the insertion loss at resonance is one decibel for the radar signal as compared to 15 decibels for the beacon signal. This loss of the beacon signal power definitely limits the reliability and range of the present beacon radar system.

It is well known that the resonant frequency of a TR box may be changed by mechanical tuning arrangements such as the insertion of tuning screws. However, any mechanical tuning arrangement for quickly and conveniently changing the resonant frequency of a TR box from one frequency to another, as from the radar frequency to the beacon frequency, necessitates the use of motors or relays which introduce additional sources of operating troubles. The problem of space conservation is also to be considered in connection with additional equipment, especially in radar systems for mounting on airplanes. The current practice in air-borne radar systems is to mount all radio-frequency components in a pressurized box which is installed inside a wing of the airplane. The present designs of airplane wings particularly in small planes imposes many limitations of size on the design of the radar systems therefor.

It is accordingly an object of my invention to provide an ultra-high-frequency radar system in which both radar signals and beacon signals may be received without substantial attenuation of either in the system.

Another object of my invention is to provide a new and improved TR box which will permit the passage therethrough of both incoming radar signals and beacon signals of different frequencies without substantial attenuation of either.

A further object of my invention is to provide a novel ultra-high-frequency radar system having a single antenna for both the transmission and reception of signals in which both radar and beacon signals of different frequencies may be received without substantial attenuation of either in the system.

A still further object of my invention is to provide a novel TR box tunable at will to pass signals of either of two predetermined frequencies.

In accordance with my invention, a TR box having a cavity resonator tuned to a first predetermined resonant frequency, such as the radar signal frequency, is provided in a radar system with means for establishing an electric discharge within the cavity resonator which is effective to tune the resonator to a second predetermined resonant frequency, such as the beacon signal frequency.

A preferred arrangement of my improved TR box includes a composite cavity resonator comprising a pair of component cavity resonators mounted adjacent to each other with a communicating passage therebetween, the composite resonator having a first predetermined resonant frequency. Means are provided for introducing energy into one of the component resonators as well as means for extracting energy from said one component resonator. The usual low-pressure electrode-gap is also provided within one component resonator and a pair of auxiliary electrodes are also mounted within the second component resonator to form an additional electrode-gap. A switch, operable at will, is arranged to connect a source of direct current potential, such as a battery, across the pair of electrodes in the second component resonator to establish an electric discharge therebetween. This discharge in the second component resonator causes an effective short circuit across the communicating passage between the two resonators whereby the composite resonator is tuned to a second predetermined frequency.

It is to be noted that while the establishment of a discharge across the usual electrode-gap in a TR box changes the TR box from an effective resonant circuit having a high Q with respect to the transmission of power therethrough to an effective non-resonant circuit having an extremely low Q, a discharge across the auxiliary electrodes in the TR box in accordance with my invention, changes the frequency of the effective resonant circuit only and the Q remains high.

The novel features which I consider characteristic of my invention are set forth with more particularity in the appended claims. My invention, however, with respect to the organization and operation thereof, together with additional objects and advantages, may be best understood from the following description of a specific embodiment with reference to the accompanying drawings in which:

Figure 1 illustrates a preferred embodiment of my invention in a schematic diagram of a radar system, Fig. 2 is a cross-sectional view along lines II—II of Fig. 1, and Fig. 3 is a schematic diagram of a modification of my invention.

As shown in the drawings, the radar system includes a transmitter 3 connected to an antenna 5 by a coaxial transmission line 7. A quarter wave length branch 9 of the coaxial line 7 is connected to a TR box 11 which in turn is connected through a coaxial line 17 to a receiving system 19, which includes a mixer 21 and a receiver 23. The TR box 11 is a composite resonator made up of a pair of component cavity resonators 13 and 15.

The resonator 13 comprises a highly conducting shell 25 which to facilitate manufacturing thereof is in two sections 27 and 29 which are joined along line 31. The shell 25 has the general form of a hollow cylinder of greater diameter than height. Mounted in the center of shell 25 along the axis thereof is a glass envelope 33, filled with gas at a low pressure which extends through central openings in both the top and bottom of the shell. A pair of hollow electrodes 35 and 37 are mounted within the envelope 33 with their ends extending toward each other but spaced apart to form a low pressure electrode-gap. The base of electrode 35 is in the form of a plate 39, a circumferential portion of which extends outside of envelope 33. Similarly, the base of electrode 37 is in the form of a plate 41, a circumferential portion of which extends outside of envelope 33. The circumferential portions of plates 39 and 41 which extend outside envelope 33 are clamped against opposite ends of shell 25, one against the top and one against the bottom, by ring members 43 and screws 45. An auxiliary electrode 46 is positioned with an end within one of the hollow electrodes 37 and extends therefrom to a terminal cap 48 on the outside of envelope 33.

Power from the branch line 9 is introduced into the cavity resonator 13 by the usual coupling loop 47 formed at the end of the line 9 and extending into the interior of the shell 25, the end of the loop being soldered to the inner wall of the shell. Energy is extracted from the resonator 13 by a similar coupling loop 49 formed at the terminal of the coaxial line 17 and soldered to the inner wall of shell 25. A tuning screw 51 is also inserted in the wall of the resonator 13 and is secured in position by a nut 53.

The second cavity resonator 15 is mounted adjacent to resonator 13 and also includes a hollow highly conducting shell 55. The shell 55 is generally similar in shape and form as the shell 25 and is likewise in two sections 57 and 59 joined at 61. A boss 63 on shell 55 surrounds an opening 65 in the wall thereof and engages a similar boss 67 surrounding an opening 69 in the wall of shell 25 so that a communicating passage is formed between the interiors of the shells 25 and 55. The shells 25 and 55 are secured to each other by plates 71 and screws 73.

Another glass envelope 75 similar to the envelope 33 and also filled with gas at a low pressure is mounted in the center of the shell 55 along the axis thereof and extends through central openings in the top and bottom of the shell. Within this envelope 75 is mounted electrode 76 similar to electrode 35 in envelope 33 and has a plate-like base 79 extending outside the envelope. An electrode corresponding to electrode 37 of envelope 33 is not found in envelope 75 but a disc 81 in the latter performs a similar function in so far as mounting of the envelope is concerned. The circumferential portions of plate-like base 79 and ring 81 outside of envelope 75 are clamped against opposite ends of shell 55 by ring member 83 and screws 85. A second electrode 87 is mounted within the envelope 75 and extends from a terminal cap 89 outside the envelope to a point adjacent but spaced from the electrode 76. Tuning screws 91 secured by nuts 93 are also mounted in the wall of shell 55.

The entire TR box 11 is grounded as shown at 84 and the terminal cap 48 on envelope 33 is connected through a switch 95, resistor 97 and a direct current source such as battery 99 to the ground while terminal cap 89 on envelope 75 is also connected to the ground through a switch 101 and another source of direct current such as battery 103. The electrodes 46 and 37 are covered with insulating material throughout most of their length as at 50 and 90 to prevent a discharge at an undesired place.

When switch 95 is closed, a direct current discharge is established between the electrode 46 and the electrode 37 within the envelope 33 of the resonator 13. This discharge provides ions in and about the space between the two electrodes 35 and 37 to facilitate the establishment of an electric discharge therebetween as the result of the introduction of a high-power signal into the resonator 13.

The communicating passage between the two resonators 13 and 15 formed by openings 65 and 69 is preferably below the cutoff dimension for transmission of electromagnetic waves of the desired frequencies. The fact that the communicating passage is below the cutoff dimension does not mean that no energy whatsoever may pass through the passage but that only a small amount of the incident energy may pass therethrough under ordinary conditions. It is well known that such a passage is substantially equivalent to a large inductive shunt susceptance and ordinarily therefore would have substantially the effect of a short circuit with respect to resonator 13. However, if the structure which constitutes the load on the other side of the passage from the resonator 13, that is, the resonator 15, presents to the passage an admittance, the susceptance of which approximately cancels the large inductive susceptance effect of the passage, a considerable amount of energy passes through the passage. To accomplish this, resonator 15 must be tuned by adjustment of the tuning screws 91 to form such a highly resonant circuit. Then while the switch 101 is open, the resonant frequency for transmission of power between input loop 47 and output loop 49 is determined jointly by the tuning of both resonators 13 and 15. When switch 101 is closed, a discharge is established between the electrodes 76 and 87 which is effective to destroy the highly resonant circuit of the cavity resonator 15 and cause an effective short at the communicating passage between resonators 13 and 15. Under such conditions the resonant frequency for transmission between the input loop 47 and the output loop 49 is determined by the tuning of the cavity resonator 13.

To prepare the TR box for use in a beacon radar system, switch 101 is first closed, establishing an electric discharge between electrodes 76 and 87 which in this embodiment is a glow discharge. The cavity resonator 13 is then tuned so that its resonant frequency corresponds to the frequency of the radar system transmitter signal by adjustment of tuning screw 54. Switch 101 is then opened. As previously set forth the resonant frequency of the TR box 11 now depends upon the joint tuning of both cavity resonators 13 and 15, and may be adjusted by the tuning screws 91 to the frequency of the beacon signal. It follows that for operation of the TR box at the radar signal frequency switch 101 is closed and to operate the TR box at the beacon signal frequency switch 101 is opened. Thus the TR box 11 may be switched from one resonant frequency to another. The tuning arrangement is largely electrical, the only mechanical operation being the manual control of switch 101. The switching arrangement is quite reliable and takes up but very little additional space.

It will be understood by those skilled in the art that the preferred composite structure shown in Figs. 1 and 2 may, of course, have two frequencies at which it will be resonant with switch 101 open. Either of these two frequencies may be used for the radar signal and then when the switch 101 is closed, the composite resonator is resonant at another third frequency for the beacon signal.

For operation as a regular radar system, both switches 95 and 101 are closed. Closure of switch 101 causes the TR box 11 to be tuned to the resonant frequency of the radar transmitter signals. Closure of switch 95 establishes an electric discharge, in this embodiment a glow discharge, between electrodes 46 and 37 to provide ions in and about the space between the electrodes 35 and 37 so that when the transmitter 3 is operating to deliver high power radar signals to the antenna, the introduction of the signals to be transmitted into the resonator 13 causes a discharge between electrodes 35 and 37. This discharge causes most of the high-power signals to be reflected and prevents their passage through the TR box 11 to the receiving system 19.

When the transmitted signals strike an object and are reflected, the reflected signals are picked up by the antenna 5 and the introduction of these relatively low-power signals at the radar frequency into the TR box 11 produces oscillations therein at the resonant frequency so that signals are transmitted through the TR box 11 to the receiving system 19.

When the operator desires a position indication, he transmits the coded signal to initiate operation of any beacon transmitter in the vicinity. Switch 101 is then opened and the signals from the beacon transmitter at the beacon signal frequency are picked up by the antenna 5 and transmitted through the TR box 11 to the receiving system without substantial loss of power.

It is to be understood that the size of the communicating passage between resonators 13 and 15 determines, to a large extent, the amount by which it is possible to change the resonant frequency. If the size of the passage is progressively increased from a given size below the cutoff dimension, the equivalent inductive shunt susceptance is reduced so that more and more energy passes through the passage while the arc is present in the resonator 15. Consequently the amount of change in the resonant frequency of the composite resonator when the arc is established in resonator 15 is also reduced. If desired, the passage may be increased in size until the TR box may be considered as a unitary cavity resonator as distinguished from a composite resonator comprising two component resonators with a communicating passage therebetween. However, the arrangement illustrated and described with reference to Figs. 1 and 2 is preferable with the passage below the cutoff dimension in that a high Q is maintained for the TR box with both frequencies as signal energy is not lost in resonator 15 while an arc is present between electrodes 76 and 87 and accurate tuning is possible.

Switching from one to a plurality of frequencies may be accomplished by employing a plurality of component cavity resonators, the total number of frequencies being equal to the total number of component resonators. For example, signals of any one of three different frequencies may be transmitted through a TR box made up of three component cavity resonators 13, 15 and 103 as shown schematically in Fig. 3. Resonator 103 is like resonator 15 and is connected to resonator 15 in the same manner as resonator 15 is connected to resonator 13. The terminal cap 105 on resonator 103 corresponds to terminal cap 89 of resonator 15 and is connected to ground through a switch 107 and another direct current source 109. With switch 101 closed the TR box has one resonant frequency. With switch 101 open and switch 107 closed, the TR box has a second resonant frequency and with both switches 101 and 107 open, it has a third resonant frequency.

Although I have shown and described a preferred embodiment of my invention, I am aware that other embodiments thereof are possible. My invention, therefore, is not to be restricted except by the spirit of the invention and the scope of the prior art.

I claim as my invention:

1. In an ultra-high-frequency system, a pair of cavity resonators mounted adjacent each other with a communicating passage therebetween below the cutoff dimension for transmission of electromagnetic waves of the frequencies at which the system is to be operated, said pair of resonators being effective to form a single composite resonator tuned to a first predetermined frequency, means connected to one of said pair of resonators for introducing energy into said one resonator, means connected to said one resonator for extracting energy therefrom, and means for establishing an electric discharge in said other resonator causing an effective short circuit across said passage, whereby said composite resonator is tuned to a second predetermined frequency.

2. In an ultra-high-frequency system, a pair of cavity resonators mounted adjacent to each other with a communicating passage therebetween below the cutoff dimension for transmission of electromagnetic waves of the frequencies at which the system is to be operated, said pair of resonators being effective to form a single composite resonator tuned to a first predetermined frequency, means connected to one of said resonators for introducing energy into said one resonator, means connected to said one resonator for extracting energy therefrom, a pair of electrodes mounted within said other resonator, and means operable at will for impressing a direct current voltage across said electrodes to establish an electric discharge therebetween causing an effective short circuit across said passage, whereby said composite resonator is tuned to a second predetermined frequency.

3. In an ultra-high-frequency system, a tube comprising a cavity resonator tuned to a first resonant frequency, means coupled to said resonator for introducing energy thereinto, means coupled to said resonator for extracting energy therefrom, means adapted to be operable at will for establishing an electric discharge within said resonator effective to tune said resonator to a second resonant frequency, and additional means responsive to the introduction of energy above a predetermined value into said resonator for establishing a different electric discharge within said resonator effective to render said resonator non-resonant and thereby prevent transmission of energy from said introducing means to said extracting means.

4. In an ultra-high-frequency system, a tube comprising first and second cavity resonators with a communicating passage therebetween, whereby said tube comprises a composite resonator tuned to a first resonant frequency, means coupled to said first resonator for introducing energy thereinto, means coupled to said first resonator for extracting energy therefrom, means adapted to be operable at will for establishing a first electric discharge within said second resonator effective to tune said composite resonator to a second resonant frequency, and means responsive to the introduction into said first resonator of energy above a predetermined value for establishing an electric discharge within said first resonator effective to render said composite resonator non-resonant and prevent transmission of energy from said introducing means to said extracting means.

5. In an ultra-high-frequency system, a tube comprising first and second cavity resonators with a communicating passage therebetween, whereby said tube comprises a composite resonator tuned to a first resonant frequency, means coupled to said first resonator for introducing energy thereinto, means coupled to said first resonator for extracting energy therefrom, means adapted to be operable at will for establishing a first electric discharge within said second resonator causing an effective short circuit across said passage and thereby tuning said composite resonator to a second resonant frequency, said passage being below the cutoff dimension for said frequencies, and means responsive to the introduction into said first resonator of energy above a predetermined value for establishing an electric discharge within said first resonator effective to render said composite resonator non-resonant and prevent transmission of energy from said introducing means to said extracting means.

6. In an ultra-high-frequency system, a pair of cavity resonators having a communicating passage therebetween below the cutoff dimension for transmission of electromagnetic waves of the frequencies at which the system is to be operated, said resonators being effective to form a single composite resonator tuned to a first frequency, and means adapted for establishing an electric discharge in one of said resonators to cause an effective short circuit across said passage and thereby tune the composite resonator to a second frequency.

7. In an ultra-high-frequency system, a pair of cavity resonators having a communicating passage therebetween below the cutoff dimension for transmission of electromagnetic waves of the frequencies at which the system is to be operated, said resonators being effective to form a single composite resonator tuned to a first frequency, one of said resonators having a low pressure gas filled region therein, and a pair of spaced electrodes mounted within said region and adapted to have a glow discharge established therebetween to tune the composite resonator to a second frequency.

8. In an ultra-high-frequency system, a pair of cavity resonators having a communicating passage therebetween whereby a single composite resonator tuned to a first frequency is formed, said passage being below the cutoff dimension for transmission of electromagnetic waves of the frequencies at which the system is to be operated, means connected to one of said resonators for introducing energy thereinto, means also connected to said one resonator for transmitting energy therefrom, said other resonator having a low pressure gas filled region therein, a pair of spaced electrodes mounted within said region, and means for establishing a glow discharge between said electrodes to tune the composite resonator to a second frequency.

9. In an ultra-high-frequency system, a tube comprising first and second cavity resonators having a communicating passage therebetween whereby a single composite resonator tuned to a first resonant frequency is formed, means coupled to said first resonator for introducing energy thereinto, means coupled to said first resonator for transmitting energy therefrom, each of said first and second resonators having a low pressure gas filled region therein, and a pair of electrodes in said region in each of said resonators, the pair of electrodes in said second resonator being adapted to have a glow discharge established therebetween at will to tune the composite resonator to a second resonant frequency, said pair of electrodes in said first resonator being connected to have a glow discharge established therebetween effective to render said composite resonator non-resonant in response to the introduction of energy above a predetermined value into said first resonator.

10. For use in an ultra-high frequency system, the combination comprising first and second cavity resonators having a communicating passage therebetween below the cutoff dimension for transmission of electromagnetic waves of the frequencies at which the system is to be operated, said resonators being effective to form a single composite resonator tuned to a first frequency, means coupled to said first resonator for introducing energy thereinto, means coupled to said first resonator for extracting energy therefrom, and a pair of electrodes in each of said resonators, each pair of electrodes being adapted to have an electric discharge established therebetween independently of the other pair to change the tuning of the composite resonator.

JESS I. MARCUM.

REFERENCES CITED

The following references are of record in the file of this patent:

UNITED STATES PATENTS

| Number | Name | Date |
| --- | --- | --- |
| 2,106,770 | Southworth et al. | Feb. 1, 1938 |
| 2,241,976 | Blewett et al. | May 13, 1941 |
| 2,311,658 | Hansen et al. | Feb. 23, 1943 |